United States Patent
Kim

(10) Patent No.: US 7,478,690 B2
(45) Date of Patent: Jan. 20, 2009

(54) POWER TRAIN FOR HYBRID ELECTRIC VEHICLE

(75) Inventor: Yong-Gi Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 95 days.

(21) Appl. No.: 11/604,634

(22) Filed: Nov. 27, 2006

(65) Prior Publication Data

US 2008/0041647 A1    Feb. 21, 2008

(30) Foreign Application Priority Data

Aug. 8, 2006   (KR) .................. 10-2006-0074681

(51) Int. Cl.
*B60K 1/00*    (2006.01)
(52) U.S. Cl. .................. 180/65.2; 180/65.6; 290/40 C
(58) Field of Classification Search ............... 180/65.2, 180/65.4, 65.5, 65.8, 65.6; 475/5, 10; 290/40 C, 290/17, 31; 903/910, 912, 914
See application file for complete search history.

(56) References Cited

U.S. PATENT DOCUMENTS

| | | | |
|---|---|---|---|
| 5,120,282 A * | 6/1992 | Fjallstrom | 475/5 |
| 5,775,449 A * | 7/1998 | Moroto et al. | 180/65.2 |
| 5,813,488 A * | 9/1998 | Weiss | 180/65.6 |
| 6,054,776 A * | 4/2000 | Sumi | 290/17 |
| 6,455,947 B1 | 9/2002 | Lilley et al. | |
| 6,551,208 B1 * | 4/2003 | Holmes et al. | 475/5 |
| 6,579,201 B2 * | 6/2003 | Bowen | 475/5 |
| 6,962,545 B2 * | 11/2005 | Larkin | 475/5 |
| 7,196,430 B2 * | 3/2007 | Yang | 290/40 C |
| 7,223,200 B2 * | 5/2007 | Kojima et al. | 475/5 |
| 7,264,071 B2 * | 9/2007 | Schmidt et al. | 180/65.6 |
| 7,276,007 B2 * | 10/2007 | Takami et al. | 475/5 |
| 7,311,627 B2 * | 12/2007 | Tarasinski | 475/5 |

FOREIGN PATENT DOCUMENTS

| | | |
|---|---|---|
| JP | 2000-326739 | 11/2000 |
| JP | 2004-150627 | 5/2004 |
| JP | 2005-112019 | 4/2005 |
| JP | 2005-121090 | 5/2005 |

* cited by examiner

*Primary Examiner*—Hau V Phan
(74) *Attorney, Agent, or Firm*—Morgan, Lewis & Bockius LLP

(57) ABSTRACT

A power train prevents the decrease in the power efficiency accompanied by the converting process between the kinetic energy and the electrical energy due to the large energy flow through the electrical path when the motor generator serves as a transmission and thus prevents the increase in the capacity of the motor generator and the bad fuel economy. The power train for a hybrid electric vehicle includes an engine, first and second motor generator, a battery, a plurality of planetary gear sets, and a plurality of breaks. The plurality of planetary gear sets convert the driving forces output from the engine, and the first and second motor generators to have an appropriate gear ratio according to a driving state and output the converted driving forces to a driving shaft. The plurality of breaks are provided in the plurality of planetary gear sets and control the output revolution on the basis of the gear ratio determined according to a driving state.

4 Claims, 2 Drawing Sheets

POWER TRAIN FOR HYBRID ELECTRIC VEHICLE

CROSS-REFERENCE TO RELATED APPLICATIONS

The present application is based on, and claims priority from, Korean Application Serial Number 10-2006-0074681, filed on Aug. 8, 2006, the disclosure of which is hereby incorporated by reference herein in its entirety.

FIELD OF THE INVENTION

The present invention relates to a power train for hybrid electric vehicles, and more particularly, to a power train for hybrid electric vehicles that is capable of reducing a driving energy output from a motor generator at an appropriate transmission gear ratio required for driving the vehicle by controlling a specific member of planetary gear sets to reduce a consumption ratio of an electrical energy and to improve the efficiency and the fuel economy of a system.

BACKGROUND OF THE INVENTION

In recent years, a request for improving the fuel economy of vehicles and a demand for environmental-friendly vehicles according to the strengthening of regulations on toxic exhaust gases become increased. Therefore, hybrid electric vehicles have attracted considerable attentions as specific alternative plans.

Hybrid electric vehicles are driven by an engine and an electrical motor, with the driving state is maintained by appropriately changing a driving mode such as an engine mode, a motor mode, or a hybrid mode corresponding to the driver's need or the driving condition.

The driving mode of the hybrid electric vehicles is classified into a HEV (hybrid emission vehicle) mode and a ZEV (zero emission vehicle). In the HEV mode, the vehicle is driven by an engine, and the exhaust gas is inevitably emitted. In the ZEV mode, the vehicle is driven by a power of the electric motor supplied with an electric power of a battery without operating the engine. Therefore, in the ZEV mode, the exhaust gas is not emitted. As a result, when the hybrid electric vehicle is driven in ZEV mode, it is possible to reduce air pollution due to the exhaust gas as compared with the conventional vehicles.

Since a generator is provided in the hybrid electric vehicle, the battery is charged by electricity generated from the generator when being driven in an engine drive mode or in an inertial drive mode.

The power transmission device of the hybrid electric vehicle is largely classified into a serial type, a parallel type, and a hybrid type. Among these, the hybrid type adopts both an advantage of the serial type that has high output power generation efficiency and an advantage of the parallel type that can simultaneously use an engine and a motor. And thus, the excellence in maximization of the hybrid effect is widely accepted.

In the hybrid power transmission device of the conventional hybrid electric vehicle, two motor generators serve as motors and generators to generate a driving force and serve as transmissions. When the motor generators serve as transmissions, the energy flow to the electrical path increases. Therefore, the conversion efficiency that should be necessarily considered in the conversion process of the kinetic energy into the electrical energy and the inverse conversion process thereof is applied to decrease the efficiency of total power transmission system.

The decrease in the efficiency of the power transmission system is remarkable in the low load and high speed driving area and the high load and low speed driving area. The increase in the electrical transmission path requires the increase in the capacity of the motor generator, which causes a bad fuel economy.

SUMMARY OF THE INVENTION

Embodiments of the present invention provide a power train for a hybrid vehicle that is capable of preventing the decrease in the power efficiency accompanied by the converting process between the kinetic energy and the electrical energy due to the large energy flow through the electrical path when the motor generator serves as a transmission and thus preventing the increase in the capacity of the motor generator and the bad fuel economy.

A power train for a hybrid electric vehicle according to an exemplary embodiment of this invention includes an engine, first and second motor generator, a battery, a plurality of planetary gear sets, and a plurality of breaks. The engine generates a driving force by burning a fuel. The first and second motor generators are supplied with electrical energies to generate driving forces and supplied with kinetic energies to output as electrical energies. The battery stores the electrical energies supplied from the first and second motor generators and supplies electrical energies required for operating the first and second motor generators. The plurality of planetary gear sets convert the driving forces output from the engine, and the first and second motor generators to have an appropriate gear ratio according to a driving state and output the converted driving forces to a driving shaft. The plurality of breaks are provided in the plurality of planetary gear sets and control the output revolution on the basis of the gear ratio determined according to a driving state.

The plurality of planetary gear sets include a first planetary gear set directly coupled to the engine and the first and second motor generators, a second planetary gear set coupled to the first planetary gear set, and a third planetary gear set coupled to the first planetary gear set and the second planetary gear set.

The first planetary gear set allows the vehicle to perform a continuously variable transmission by controlling the driving forces output from the first and the second motor generators in a driving mode as an electric vehicle.

The second planetary gear set transfers the driving force of the engine through a mechanical path in a low load and high speed driving mode of hybrid driving mode, and supplements the power by using the electrical energy of the battery in a stepped transmission mode exclusive to high speed mode at a low gear ratio.

The third planetary gear set transfers the driving force of the engine through a mechanical path in a high load and low speed driving mode of hybrid driving mode, and supplements the power by using the electrical energy of the battery in a stepped transmission mode exclusive to low speed mode at a high gear ratio.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
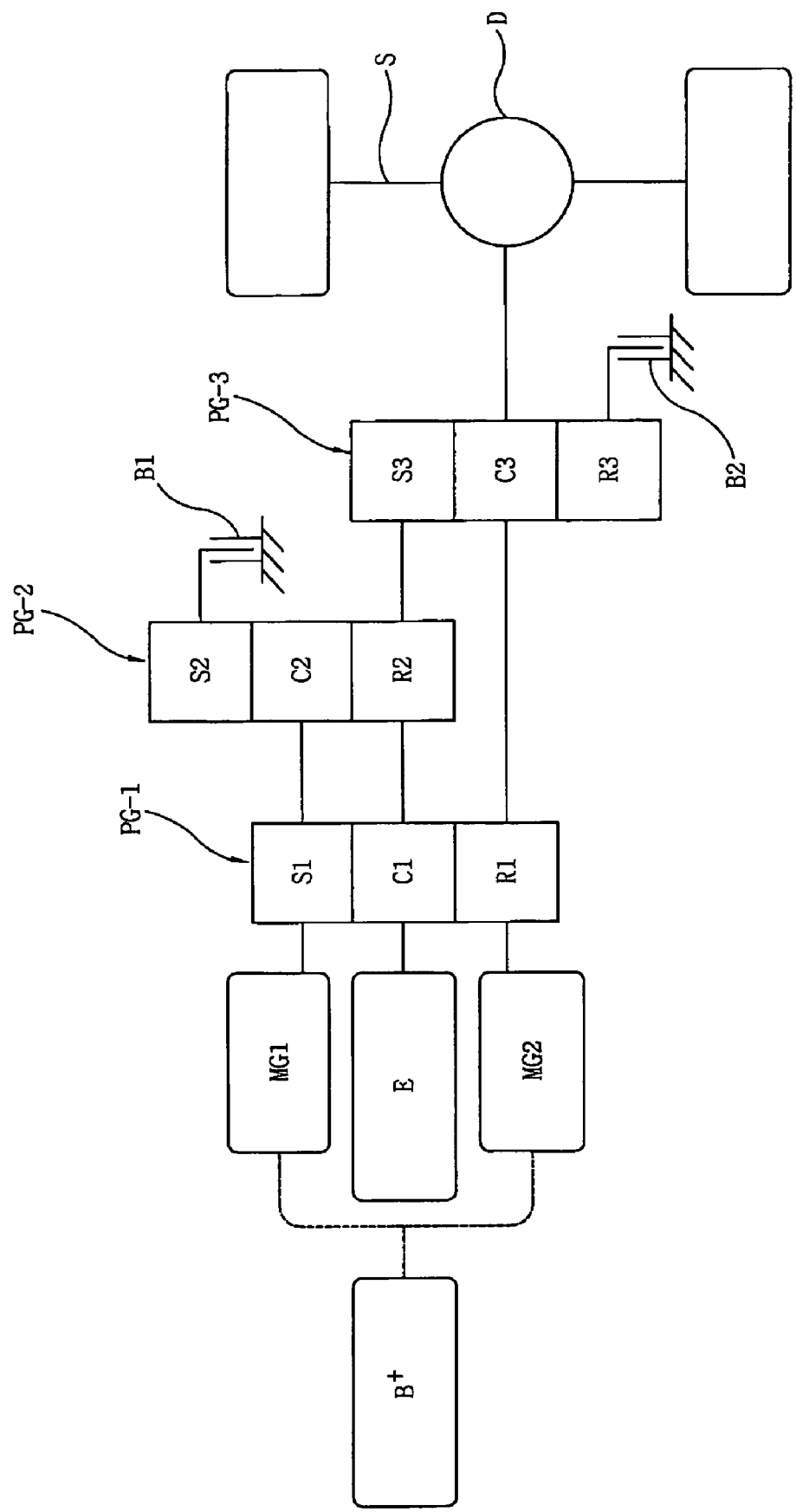
FIG. 1 is a schematic diagram showing a power train for a hybrid electric vehicle according to an exemplary embodiment of the present invention.

Referring to FIG. 1, a power train according to an exemplary embodiment of the present invention includes an engine E, a first motor generator MG1, a second motor generator MG2, a first planetary gear set PG-1, a second planetary gear set PG-2, a third planetary gear set PG-3, a first break B1, and a second break B2. The engine E burns fuel in a combustor to generate a driving force required for driving the vehicle. The first and second motor generators MG1 and MG2 generate driving forces required to drive the vehicle by means of an electrical energy stored in a battery B+ and a generated electrical energy and convert a kinetic energy supplied from the outside into an electrical energy to store in the battery B+. The first, second, and third planetary gears PG-1, PG-2, and PG-3 transform the driving forces output from the first and second motor generators MG1 and MG2 into a proper gear ratio depending on the driving state of the vehicle to output to a driving shaft. The first and second breaks B1 and B2 are provided in the second and third planetary gears PG-2 and PG-3 to control the output revolution on the basis of the gear ratio determined depending on the driving state of the vehicle.

In this case, the battery B+ supplies an electrical energy required for operating the first and second motor generators MG1 and MG2 and charges the electrical energy generated from the first and second motor generators MG1 and MG2 according to the driving state to store the electrical energy. That is, the battery B+ charges and discharges the electrical energy to/from the first and second motor generators MG1 and MG2.

The setting states of the engine E, the first and second motor generators MG1 and MG2, the first, second, and third planetary gears PG-1, PG-2, and PG-3, and the first and second breaks B1 and B2 will be described in below. However, as shown in FIG. 1, each of the first planetary gear set PG-1, the second planetary gear set PG-2, and the third planetary gear set PG-3 comprises a single pinion planetary gear set.

The first motor generator MG1 is coupled to a first sun gear S1 of the first planetary gear set PG-1, the engine E is coupled to a first carrier C1 of the first planetary gear set PG-1, and the second motor generator MG2 is coupled to a first ring gear R1 of the first planetary gear set PG-1.

The first break B1 is coupled to a second sun gear S2 of the second planetary gear set PG-2, the first sun gear S1 is coupled to a second carrier C2 of the second planetary gear set PG-2, and the first carrier C1 is coupled to a second ring gear R2 of the second planetary gear set PG-2.

The second ring gear R2 is coupled to a third sun gear S3 of the third planetary gear set PG-3, the first ring gear R1 is coupled to a third carrier C3 of the third planetary gear set PG-3, and the second break B2 is coupled to a third ring gear R3 of the third planetary gear set PG-3. The third carrier C3 is coupled to a slave reduction gear D and the slave reduction gear D is coupled to a driving shaft S.

With this configuration, when the vehicle is driven in a low load and high speed mode, the first break B1 changes a power transmission path and a low power from the engine E is supplied to the vehicle to be driven at a high speed using a high revolution of the second motor generator MG2.

Further, when the vehicle is driven in a high load and low speed mode, the second break B2 changes a power transmission path and a high output power from the engine E is supplied to the vehicles and a high torque according to a low revolution of the second motor generator MG2 is applied thereto and thus, the vehicle is driven with a high power at a low speed.

Hereinafter, the operation of the power train for a hybrid electric vehicle according to an exemplary embodiment of this invention will be described.

The driving mode of the power train according to the embodiment may be classified into three types.

The first mode is a continuously variable driving mode in which the first break B1 and the second break B2 are released and the vehicle is driven by driving forces supplied from the engine E and the second motor generator MG2.

In this case, the vehicle speed is controlled by the second motor generator MG2 to realize the continuously variable driving mode, that is, it is possible to be driven in the ZEV mode.

Specifically, in the ZEV mode, a driving force generated from the engine E and a driving force generated from the second motor generator MG2 are output via a plurality of planetary gear sets and the output driving forces are output to the driving shaft S via the slave reduction gear D.

Figure 2:
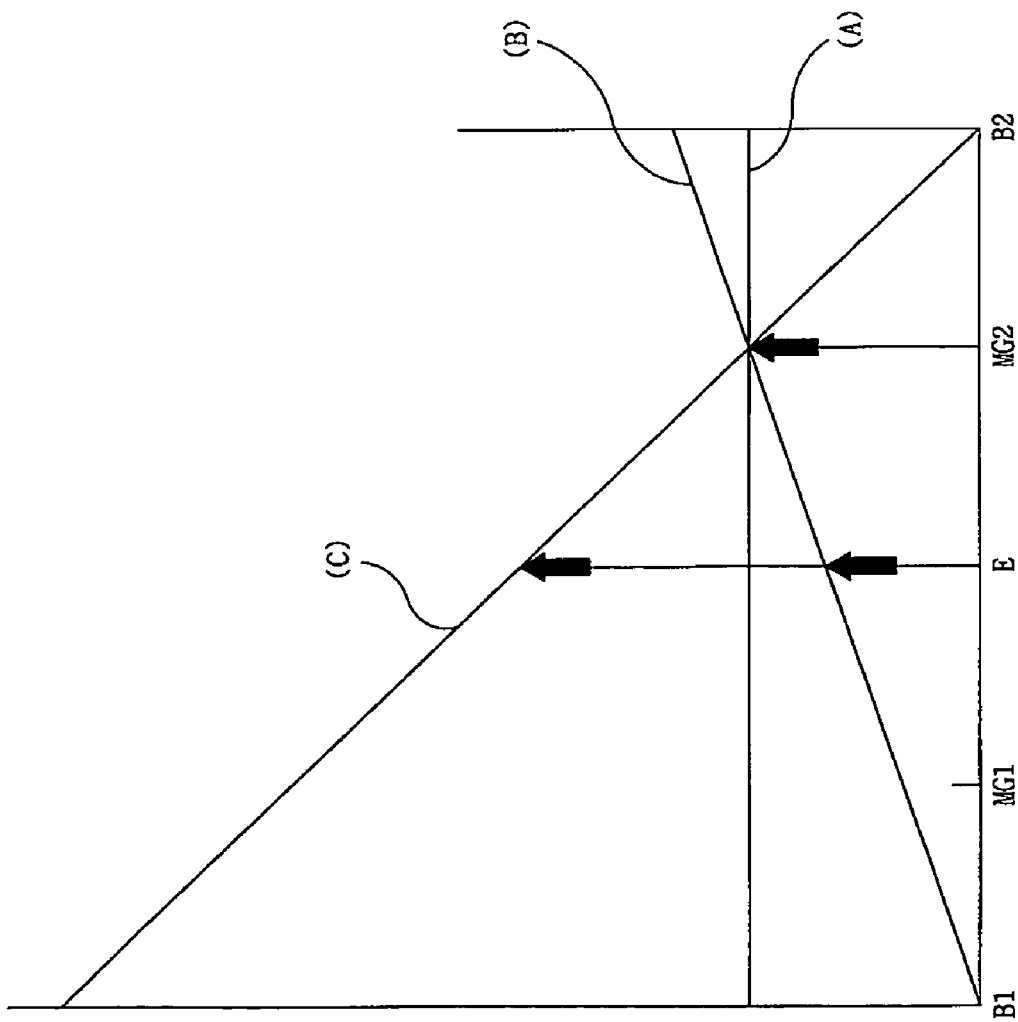
FIG. 2 is a lever analysis diagram for the exemplary embodiment of FIG. 1.

The first driving mode is represented by A in a lever analysis diagram of FIG. 2.

The second mode is a low load and high speed mode in which only the first break B1 is engaged and the vehicle is driven by driving forces supplied from the engine E and the second motor generator MG2.

In this mode, the vehicle is in a stepped transmission mode exclusive to high speed mode at a low gear ratio, and the driving force thereof is supplemented by an electrical energy stored in the battery B+.

Specifically, in the low load and high speed driving mode, the driving force is transferred to the driving shaft S through the same process as the ZEV mode to drive the vehicle, which is preceded by the engagement of the first break B1.

The second driving mode is represented by B in a lever analysis diagram of FIG. 2.

The third mode is a high load and low speed driving mode in which only the second break B2 is engaged and the vehicle is driven by driving forces supplied from the engine E and the second motor generator MG2.

In this mode, the vehicle is in a stepped transmission mode exclusive to low speed mode at a high gear ratio, and the driving force thereof is supplemented by an electrical energy stored in the battery B+.

Specifically, in the high load and low speed driving mode, the driving force is transferred to the driving shaft S through the same process as the ZEV mode to drive the vehicle, which is preceded by the engagement of the second break B2.

The third driving mode is represented by C in a lever analysis diagram of FIG. 2.

As is apparent from the foregoing, according to the power train for a hybrid electric vehicle according to the embodiment of the present invention, a driving force required in a normal driving mode is generated by the engine and the motor generators, and the vehicle is driven through a continuously variable transmission process by controlling the speed by the motor generators.

In a high speed driving mode, the required driving forces are obtained by operating the engine and the motor generators through a mechanical path, and the power is supplemented by an energy stored in the battery in the stepped transmission mode exclusive to high speed mode at a low gear ratio.

Further, in a low speed driving mode, the required driving forces are obtained by operating the engine and the motor generators through a mechanical path, and the power is supplemented by an energy stored in the battery in the stepped transmission mode exclusive to low speed mode at a high gear ratio.

When outputting a driving force at a proper transmission gear ratio, it is possible to previously decrease a driving force output from a motor generator by restricting a specific one of a plurality of planetary gear sets. Therefore, it is possible to reduce the consumption ratio of the electrical energy and thus improve the efficiency and the fuel economy of the vehicle.

Although exemplary embodiments of the present invention are described for illustrative purposes, those skilled in the art will appreciate various modifications and changes thereof are possible without departing from the scope and spirit of the present invention, which is set forth in the appended claims.

What is claimed is:

1. A power train for a hybrid electric vehicle, comprising:
an engine that generates a driving force by burning a fuel;
first and second motor generators that are supplied with electrical energy to generate driving forces and supplied with kinetic energies to output as electrical energy;
a battery that stores the electrical energy supplied from the first and second motor generators and supplies electrical energy required for operating the first and second motor generators;
a plurality of planetary gear sets that convert the driving forces output from the engine, and the first and second motor generators to have an appropriate gear ratio according to a driving state and output the converted driving forces to a driving shaft; and
a plurality of breaks that are provided in the plurality of planetary gear sets and control the output revolution on the basis of the gear ratio determined according to a driving state;
wherein the plurality of planetary gear sets include a first planetary gear set directly coupled to the engine and the first and second motor generators, a second planetary gear set coupled to the first planetary gear set, and a third planetary gear set coupled to the first planetary gear set and the second planetary gear set;
the first planetary gear set allows the vehicle to perform a continuously variable transmission by controlling the driving forces output from the first and the second motor generators in a driving mode as an electric vehicle;
the second planetary gear set transfers the driving force of the engine through a mechanical path in a low load and high speed driving mode of hybrid driving mode, and supplements the power by using the electrical energy of the battery in a stepped transmission mode exclusive to high speed mode at a low gear ratio, and
the third planetary gear set transfers the driving force of the engine through a mechanical path in a high load and low speed driving mode of hybrid driving mode, and supplements the power by using the electrical energy of the battery in a stepped transmission mode exclusive to low speed mode at a high gear ratio.

2. The power train as defined in claim 1, wherein;
the first planetary gear set includes a first sun gear coupled to the first motor generator, a first carrier coupled to the engine, and a first ring gear coupled to the second motor generator;
the second planetary gear set includes a second sun gear coupled to a first break, a second carrier coupled to the first sun gear, and a second ring gear coupled to the first carrier; and
the third planetary gear set includes a third sun gear coupled to the second ring gear, a third carrier coupled to the first ring gear and a slave driving device, and a third ring gear coupled to a second break.

3. A power train for a hybrid electric vehicle, comprising:
an engine;
first and second motor generators;
a battery communicating with the first and second motor generators;
a first planetary gear set including a first sun gear coupled to the first motor generator, a first carrier coupled to the engine, and a first ring gear coupled to the second motor generator,
a second planetary gear set including a second sun gear coupled to a first break, a second carrier coupled to the first sun gear, and a second ring gear coupled to the first carrier; and
a third planetary gear set including a third sun gear coupled to the second ring gear, a third carrier coupled to the first ring gear and a slave driving device, and a third ring gear coupled to a second break, whereby the plurality of planetary gear sets convert driving forces output from the engine, and the first and second motor generators to have an appropriate gear ratio according to a driving state and output the converted driving forces to a driving shaft.

4. The power train as defined in claim 3, wherein:
the first planetary gear set allows the vehicle to perform as a continuously variable transmission by controlling driving forces output from the first and the second motor generators in a driving mode as an electric vehicle,
the second planetary gear set transfers driving force of the engine through a mechanical path in a low load and high speed driving mode of hybrid driving mode, and supplements the power by using the electrical energy of the battery in a stepped transmission mode exclusive to high speed mode at a low gear ratio, and
the third planetary gear set transfers driving force of the engine through a mechanical path in a high load and low speed driving mode of hybrid driving mode, and supplements the power by using the electrical energy of the battery in a stepped transmission mode exclusive to low speed mode at a high gear ratio.

* * * * *